Nov. 2, 1948.  F. H. JOHNSON ET AL  2,452,573
DIRECT CURRENT APPARATUS FOR WELDING
UTILIZING ENERGY STORAGE APPARATUS
Filed March 22, 1943  6 Sheets-Sheet 2
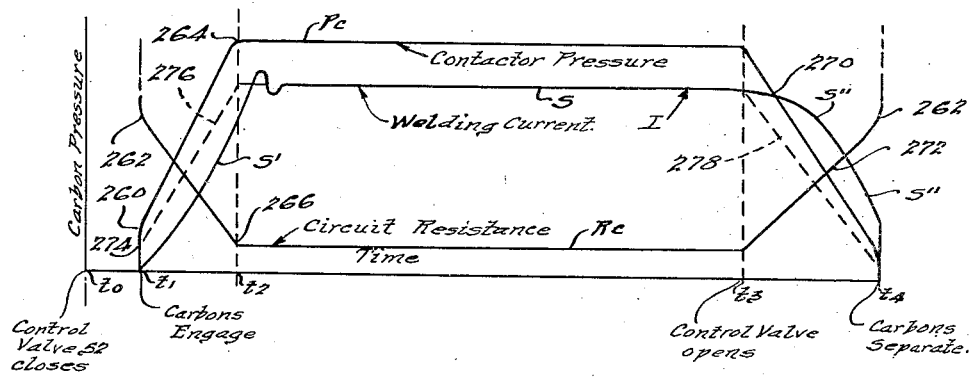
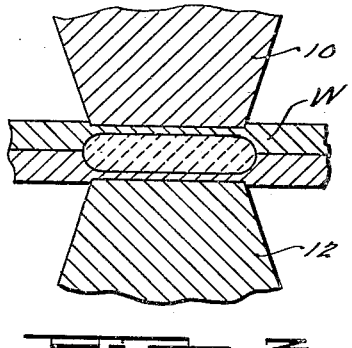
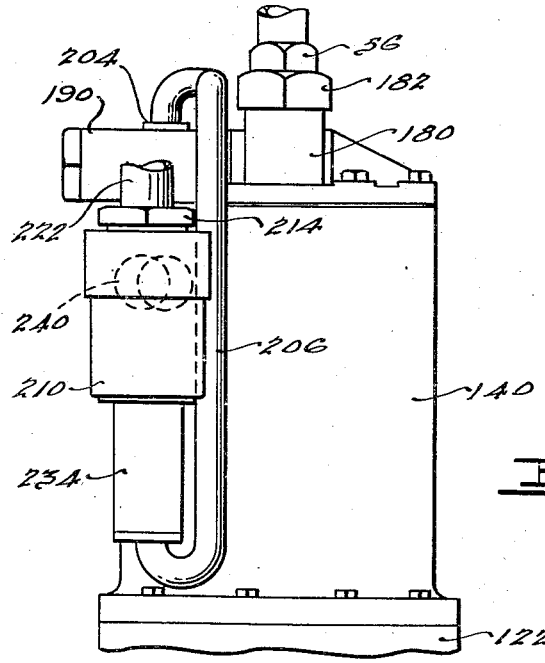
INVENTORS.
Fred H. Johnson,
BY Chester F. Leathers.
Harness, Dickey & Pierce
ATTORNEYS.

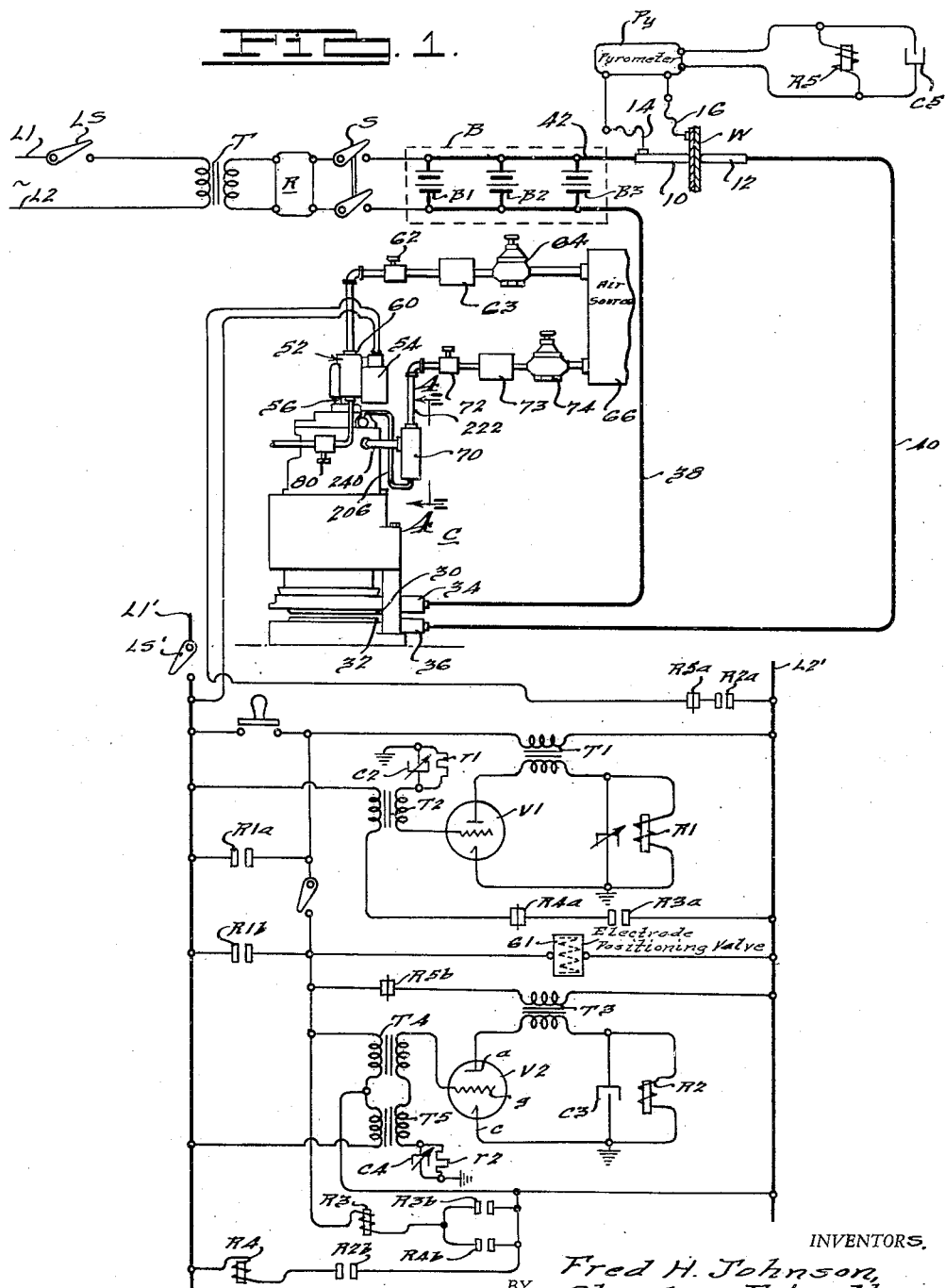

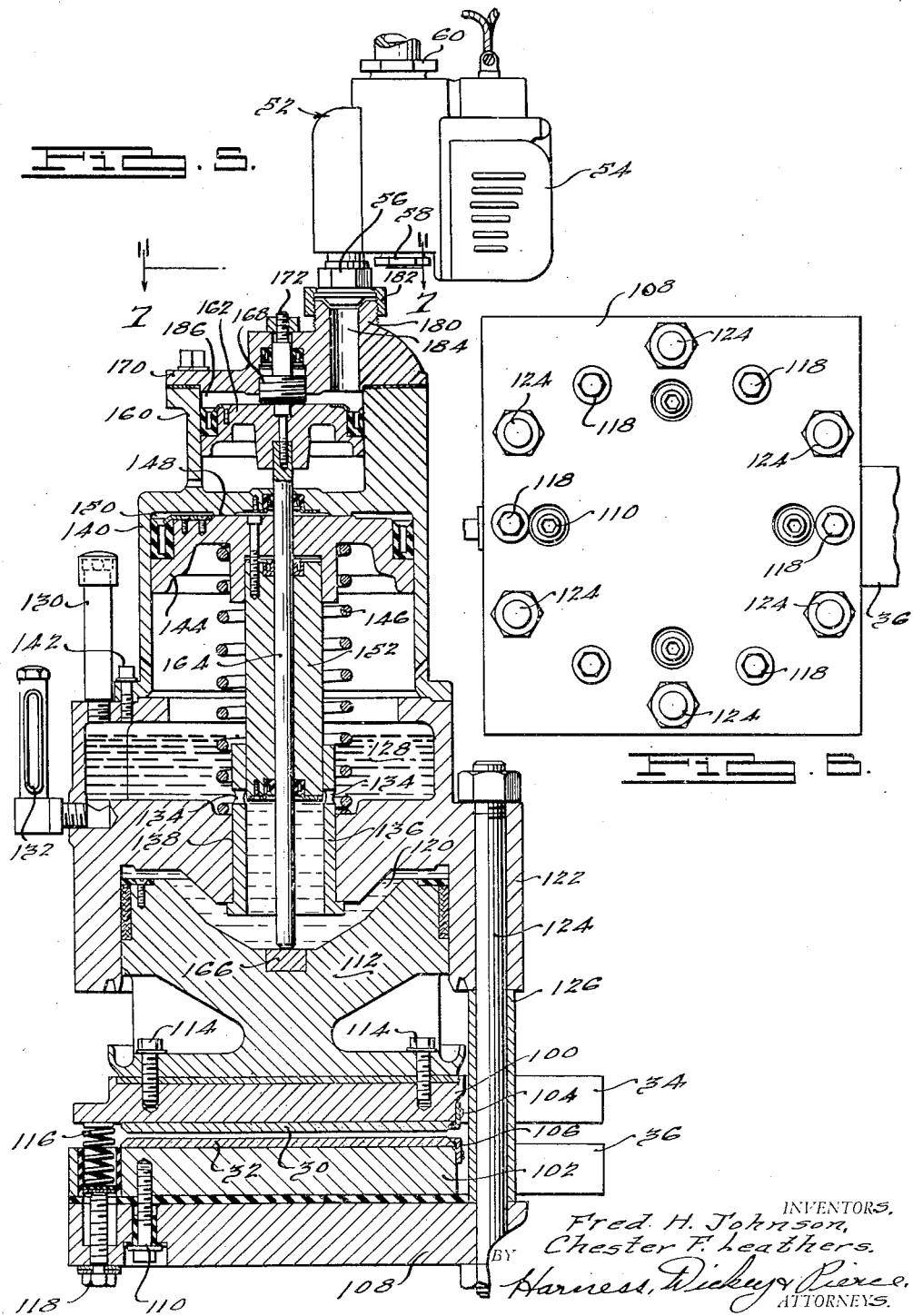

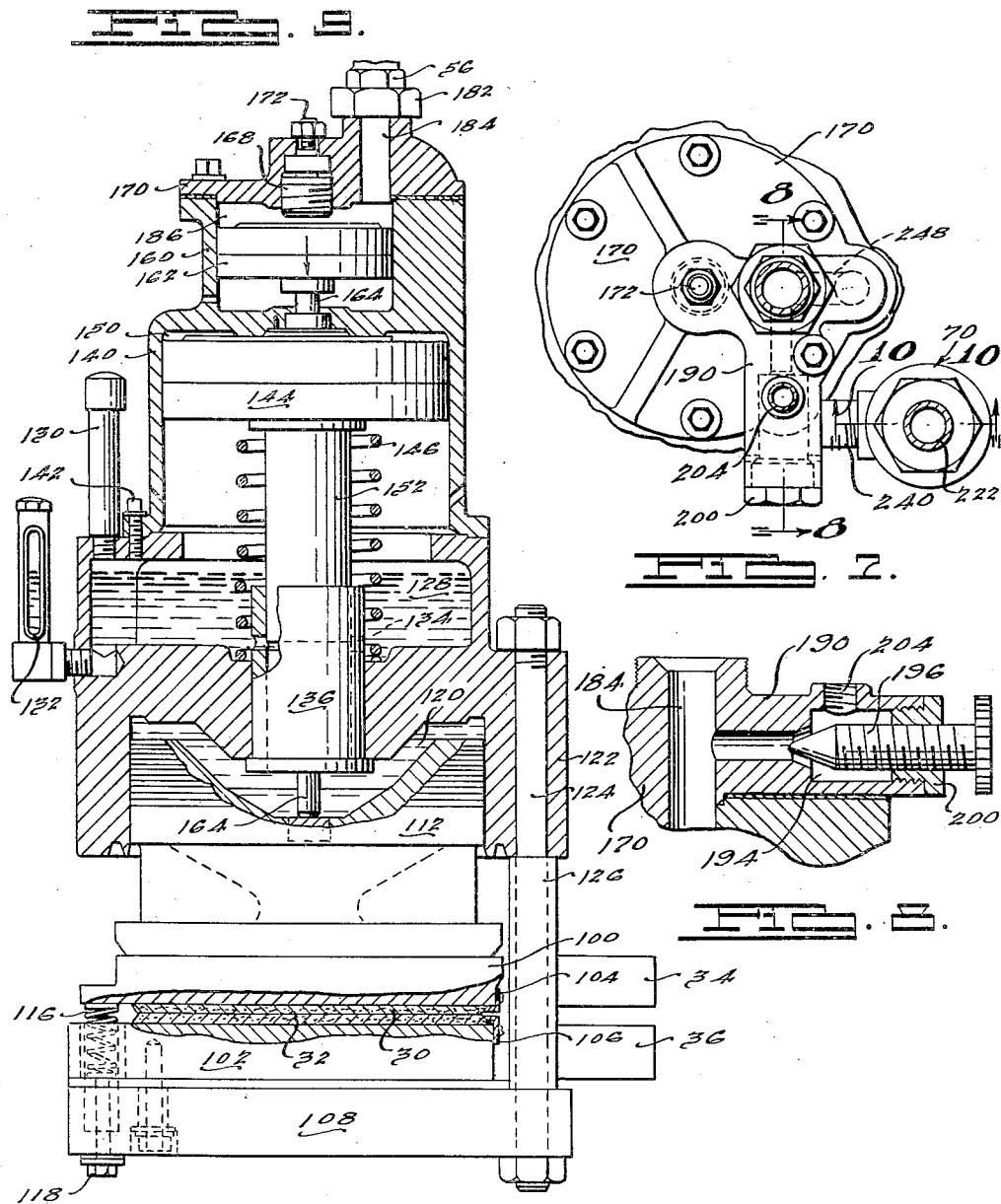

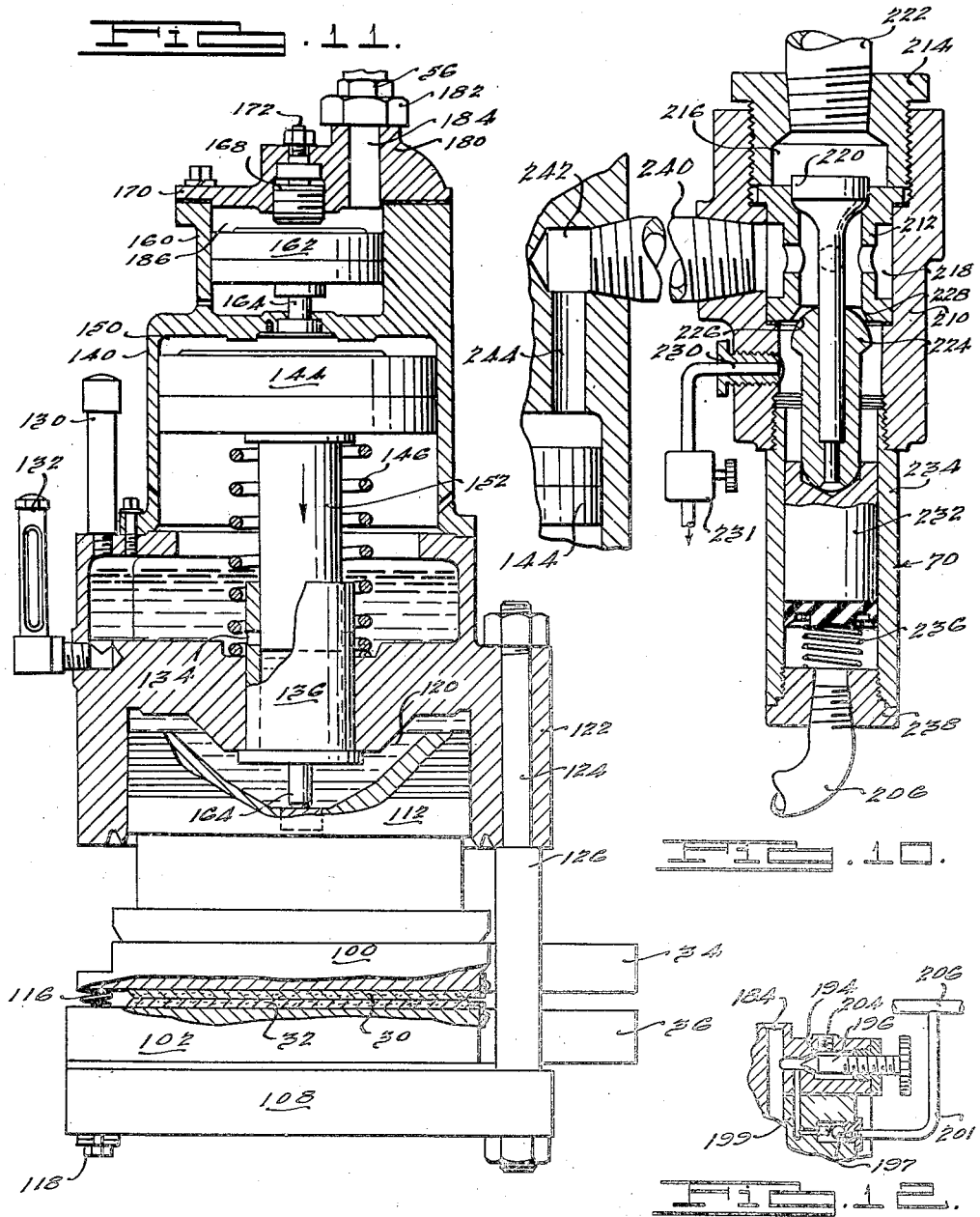

Nov. 2, 1948.　　　　F. H. JOHNSON ET AL　　　　2,452,573
DIRECT CURRENT APPARATUS FOR WELDING
UTILIZING ENERGY STORAGE APPARATUS
Filed March 22, 1943　　　　　　　　　　　　　6 Sheets-Sheet 6
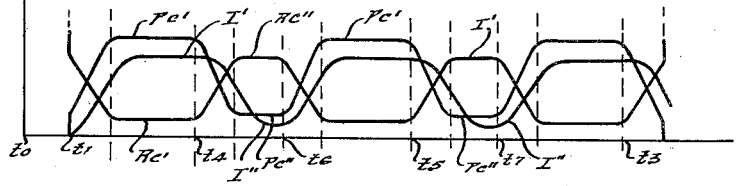
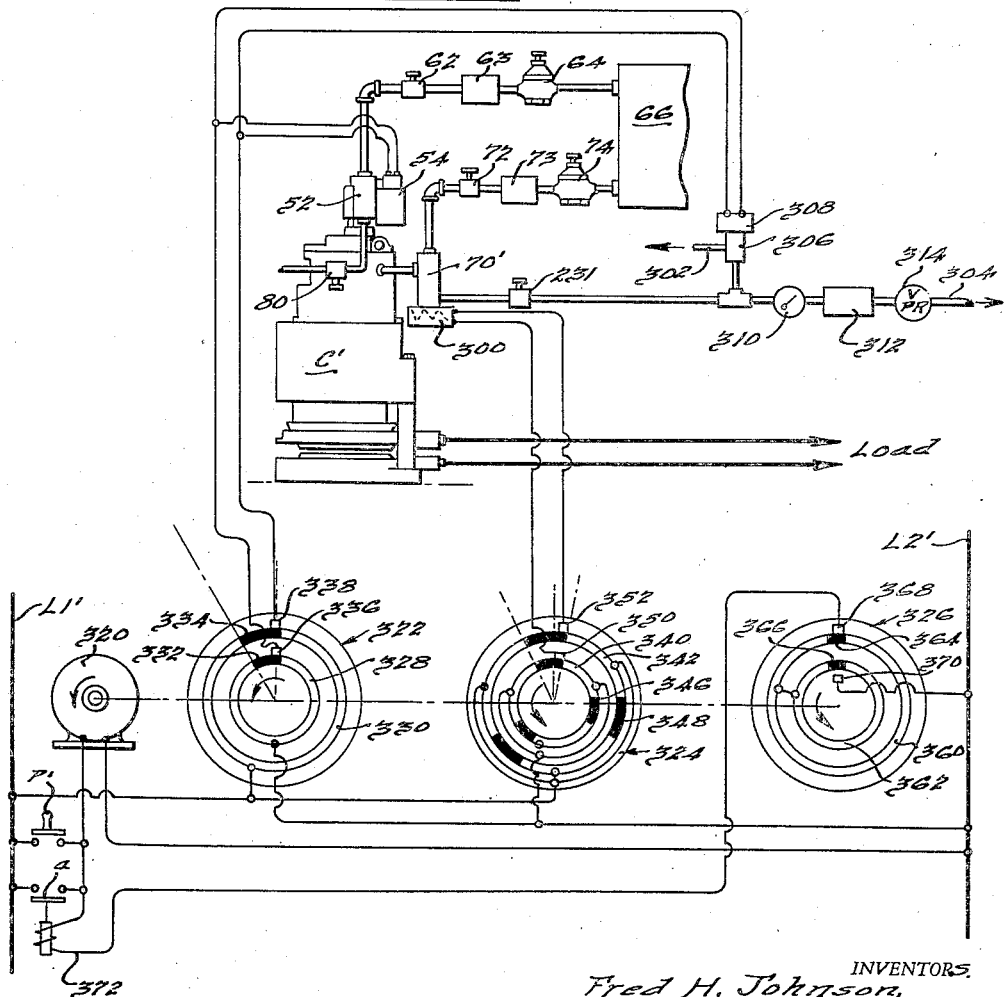
INVENTORS.
Fred H. Johnson,
Chester F. Leathers.
BY Harness, Dickey & Pierce.
ATTORNEYS.

Patented Nov. 2, 1948

2,452,573

UNITED STATES PATENT OFFICE 2,452,573

DIRECT-CURRENT APPARATUS FOR WELDING UTILIZING ENERGY STORAGE APPARATUS

Fred H. Johnson, Pleasant Ridge, and Chester F. Leathers, Detroit, Mich.; said Leathers assignor to Progressive Welder Company, Detroit, Mich., a corporation of Michigan Application March 22, 1943, Serial No. 479,998

5 Claims. (Cl. 219—4)

1

The present invention relates to apparatus for electric welding, and in particular is directed to the provision of an improved such arrangement utilizing batteries or equivalent current storage elements as the source of power for making successive welds.

The principal objects of the present invention are to provide apparatus for resistance welding or other purposes, utilizing a uni-directional current flow, whereby inductive losses are largely, if not entirely, eliminated; to provide such an arrangement utilizing control means operable to gradually increase the welding current at the beginning of each welding cycle and, preferably, to gradually decrease the welding current at the conclusion of each welding cycle; to provide such an arrangement utilizing thermoelectrically operable means to determine the length of each welding cycle in accordance with the temperature of the work in the region of the weld nugget; to provide such an arrangement utilizing energy storing apparatus arranged to deliver welding impulses which have a constant maximum value for desired parts of each welding cycle, and wherein the current gradually rises to and/or falls gradually from the maximum value at the beginning and end of each such impulse; to provide such an arrangement utilizing energy storage apparatus having such capacity that the quantity of current utilized for each weld is a relatively small fraction of such capacity, whereby if desired, a substantial number of welds may be made between charging operations, thereby enabling the welding apparatus to be used remotely from its source of charging current; and to provide such an arrangement wherein the energy storage apparatus is recharged in the interval between each successive weld by means of a continuously active source, whereby a part of the current requirements of each weld are derived directly from such source of charging current, and whereby a welding impulse of large value may be provided with only a relatively light current demand rate from the source.

With the above as well as other objects in view, which appear in the following description and in the appended claims, a preferred but illustrative embodiment of the invention is shown in the accompanying drawings, throughout the several views of which corresponding reference characters are used to designate corresponding parts and in which:

Figure 1 is a diagrammatic view of a welding control system embodying the invention;

2

Fig. 2 is a diagrammatic view illustrative of the relation, during a welding cycle, between the contactor pressure, the resistance of the welding circuit and the current in the welding circuit;

Fig. 3 is a diagrammatic view, illustrating the engaging relation between the work and the electrodes of a resistance welding machine;

Fig. 4 is a fragmentary view, partly in elevation and partly in section, taken along the line 4—4 of Fig. 1;

Fig. 5 is a view in longitudinal central section of the contactor structure of Fig. 1;

Fig. 6 is a bottom view based upon Fig. 5;

Fig. 7 is a plan view, taken along the line 7—7 of Fig. 5;

Fig. 8 is a view in section taken along the line 8—8 of Fig. 7;

Fig. 9 is a view corresponding generally to Fig. 5, but showing the contactor elements in a second operating position;

Fig. 10 is a view in section, taken along the line 10—10 of Fig. 7;

Fig. 11 is a view corresponding generally to Figs. 5 and 9, but showing the contactor in a third operating position;

Fig. 12 is a fragmentary view of a modification of the invention;

Fig. 13 is a diagrammatic view of a modified welding cycle, appropriate, for example, for a seam welding operation; and Fig. 14 is a diagrammatic view of an illustrative control system suitable for producing the cycle of Fig. 13.

It will be appreciated from a complete understanding of the present invention that, in a generic sense, the improvements thereof may be embodied in apparatus differing widely from the herein disclosed apparatus and may be utilized for purposes other than the herein described purposes. A preferred use of the invention is in connection with electric welding apparatus, such as resistance welding apparatus, and by way of illustration, but not of limitation, the invention is so described herein.

The herein disclosed welding system uses one or more storage batteries, which generically may be arranged in various parallel series and series-parallel arrangements, so as to provide the proper output voltage and current capacity, as the source of current for delivery to the work through the associated electrodes and will thus be recognized as being of the stored energy type. Various such systems have heretofore been proposed such, for example, as the system disclosed in the Woodrow Patent No. 1,183,264 and in the Thomson Patent No. 394,892. These systems are advantageous in that each current impulse has a maximum value which remains substantially uniform throughout at least the major portion of such impulse, as is indicated by the flat portion s of the current curve I in Fig. 2. Because of this, the entire welding circuit may be regarded as non-inductive during such major portion of each welding impulse. This factor eliminates substantial losses present in alternating current systems and in stored energy systems of the reactive type such, for example, as that disclosed in Chubb Patent No. 1,066,468. This feature also eliminates difficulties resulting from the variations in inductance of the welding circuit which are normally produced in making a series of welds which are distributed over the surface of relatively wide sheets. Stored energy systems are further advantageous for the reason that the recharging thereof may take place during the intervals between welds, and at a rate materially lower than the rate at which current is drawn from the apparatus in making a weld, thereby avoiding the drawing of heavy surge currents directly from the line.

So far as the present applicant is aware, however, the battery systems heretofore proposed have been commercially unsatisfactory because of the switching problems encountered in closing and in opening the circuit between the batteries and the welding electrodes. It will be understood that welding current intensities up to and in excess of 50,000 amperes are frequently required by present day welding operations. Although these currents are delivered at relatively low voltages, a very difficult switching problem is involved. These difficulties, as well as others, are efficiently and economically overcome in the practice of the present invention by introducing resistance into the battery circuit, preferably as an incident to both opening and closing operations, so that upon closing the circuit the current rises gradually and at a controllable rate from a minimum value to the maximum value. In opening the circuit, also, the current is gradually reduced from its maximum value to a minimum value which is low enough to enable it to be interrupted by relatively simple contactor mechanism without introducing objectionable arcing problems. In the practice of the present invention, consequently, each welding current impulse takes the form shown diagrammatically in Fig. 2, in which the current intensity I rises gradually from a zero value along the line $s'$, maintains a uniform maximum value $s$ throughout the major portion of the welding current impulse, and gradually falls off from the maximum value along the portion $s''$.

In addition to its importance to the solution of the switching problem, the gradual rise in value of the current from a minimum to a maximum value at the beginning of each weld cycle is also important from the standpoint of the welding operation itself. Considerable effort has been expended in recent years on the problem of efficiently welding certain metals such as aluminum and various alloys thereof, such, for example, as those used in present day aircraft construction. These materials melt at relatively low temperatures, and for this and other reasons there is a tendency for particles on the electrode-engaged surface of the material to become molten and stick to the electrode. This "pickup" of metal has been a material obstacle to the welding of these materials and has led to the use of expensive and time consuming cleaning operations to prepare the materials and the electrodes for the welding operation. These cleaning operations have been so expensive in many cases as to overcome any advantages otherwise resulting from the use of welding operations as distinguished from riveting operations or the like.

It has been discovered, in the practice of the invention, that this "pickup" problem is very materially lessened by the above-mentioned gradual rise in current flow. This appears to be for the reason that the initial low intensity of current serves to burn away or otherwise dispose of impurities (such as oil, grease, oxides, etc.) between the work engaging surface of the electrode and the work, which impurities lead to the pickup. It may be expected, also, that when the electrodes initially engage the work, the engagement is not uniform over the electrode surface but is, instead, made up of a series of point-to-point contacts. The initial low current value renders these "points" plastic without making them molten and enables the electrodes to solidly and evenly seat against the surface of the work. Also, it may occur that upon the initial engagement between the work and the electrodes, a greater pressure appears at one side of an electrode than at the other, and the above preheating appears to render the work plastic enough to deform slightly and equalize the pressure across the face of the electrode. The conditions herein mentioned are illustrative of conditions which lead to an initially high contact resistance between the electrode and the work, which high resistance causes sufficient heating at such junction to cause the pickup. The gradual current rise has been found to so far reduce this contact resistance as to very materially lessen the amount of "pickup." Various rates of current rise may be used within the purview of the invention, but a time interval of the order of one to two hundredths of a second for the rise from minimum to maximum value has been found satisfactory in practice.

Preferably, the welding electrodes are refrigerated to a normal temperature of the order of $-15°$ F. This arrangement improves the accuracy of the control and also protects the thermoelectric elements from deterioration, and also further reduces the amount of "pickup."

Battery operated systems are further advantageous in that battery capacities may conveniently be employed such that the current requirements per weld represent only a relatively small fraction of the capacity of the battery, thereby enabling the welding apparatus to be used remotely from the source of charging current. It has not been possible to realize this advantage with prior systems, with which the present applicant is familiar, however, because of the fact that if more than a limited number of welds are made between recharging operations the decrease in voltage of the welding circuit becomes large enough to materially alter the amount of current delivered to the weld per unit of time. This difficulty is effectively overcome in the practice of the present invention by controlling the duration of each welding current impulse thermoelectrically in accordance with the arrangement disclosed and broadly claimed in Patent No. 2,372,211, granted March 27, 1945, on aplication, Serial No. 442,463, filed May 11, 1942, as a continuation-in-part of the now abandoned application, Serial No. 415,015, filed October 15, 1941. More particularly, the thermoelectric apparatus is arranged to produce an E. M. F. which is proportional to the temperature of the work in the immediate region of the weld. The thermoelectric apparatus, in addition to compensating for variations in the voltage of the welding circuit, also compensates for variations in surface characteristics of the work, variations in thickness of the work, such as are introduced by forming successive welds between differing numbers of sheets, and variations in cross-sectional area of the electrode tips such as are introduced by electrode wear and the like. The combination in the present system of the thermoelectric apparatus, consequently, enables the production of entirely uniform welds under widely varying operating conditions.

The "portable" feature of the present invention is further advantageous in the welding of large parts, such as aircraft wing assemblies, and the like, where the length of each assembly fixture is so large as to introduce a need for excessive amounts of bus bar equipment if the welder is to be stationary relative to the fixture. The present structure may be transported to various positions along the fixture and is thus not only very convenient, but very economical to use.

A further feature of the present invention resides in continuously connecting the storage battery system to a source of charging current except under circumstances when it is desired to use the welding apparatus remotely from the source of power. This feature eliminates the necessity for automatic switchgear to disconnect the batteries from the source of charging current as an incident to the making of each weld and also enables a portion of the energy required for each weld to be drawn directly from such source.

Referring now to Figure 1, the illustrative control system there shown comprises a transformer T, which is connected through a conventional rectifier R and a selectively operable disconnect switch S to supply charging current to a storage battery unit B. The storage battery unit B is illustrated as comprising three batteries B1, B2 and B3, which are connected in parallel with each other, although, as aforesaid, other specific battery combinations may be utilized.

The battery unit B is serially connected through the hereinafter described contactor C to the welding circuit, which is illustrated as including a pair of electrodes 10 and 12, which may, as will be understood, be provided with suitable operating mechanism to enable them to be separated or applied to the work W with a predetermined pressure. The electrodes 10 and 12 are to be taken as illustrative of various welder arrangements.

The thermoelectric apparatus is illustrated as comprising a pair of thermocouple leads 14 and 16, which are connected, respectively, to the electrode 10 and to the work W, it being assumed for the purposes of the present description that the work W and the electrode 10 are formed of material such as aluminum and copper, respectively, which together form a thermocouple. The E. M. F. developed between the thermocouple elements 14 and 16 is applied to the input terminals of a pyrometer Py, the output terminals of which are connected to the coil of a usual electromagnetic control relay R5 and to a control condenser C5. It will be understood that when the thermoelectric E. M. F. developed between the leads 14–16, as the welding current heats the work, reaches a critical value, the pyrometer operates suitable circuit controlling means (not shown) and thereby connects relay R5 to a source of current, said critical value being adjustable as described in said Patent 2,372,211. With this arrangement, the actual temperature measured is the temperature at the junction between the work and the face of the electrode, which, in the absence of shunting effects of neighboring welds, is accurately proportional to the temperature in the body of the weld nugget. In cases where shunting effects are substantial enough to require recognition, other couplings may be used, as disclosed in said copending application, Serial No. 442,463, such, for example, as a coupling which responds to the temperature at the center of the face of the electrode. In the present description and claims, the apparatus is generically described as functioning in accordance with the temperature in the region of the weld, independently of the type of thermal coupling that is used.

In the broader aspects of the invention, various switching mechanisms may be utilized to control the completion and interruption of the welding circuit and to control the variation in the resistance thereof. One such contactor mechanism is disclosed in the copending application of Chester F. Leathers, Serial No. 432,194, filed February 25, 1942, now Patent No. 2,347,695, granted May 2, 1944. Preferably, the contactor C, which is described in detail in connection with Figs. 4 through 11, is employed. This contactor is described and claimed in applicant's copending application Serial No. 751,102, filed May 28, 1947, as a division hereof, and operates on the generally familiar carbon pile principle. While various numbers of carbon or equivalent elements may be utilized in it, it is illustrated as comprising only two carbon elements 30 and 32, which elements are permanently electrically connected to terminals 34 and 36, respectively. Terminals 34 and 36, in turn, are permanently connected to conductors 38 and 40, which are connected, respectively, to one terminal of the battery unit B and to the electrode 12. Conductor 42 permanently connects the other terminal of the battery unit to electrode 10. In the normal position of the contactor C, shown in Fig. 1, the carbon elements 30 and 32 are separated from each other and the contactor thus serves, in its normal condition, to interrupt the welding circuit.

The contactor comprises combined pneumatic and hydraulic control mechanism for bringing the carbon elements 30 and 32 into engagement with each other and to variably control the pressure applied between them. This mechanism responds to the energization of the solenoid 54, associated with a usual electromagnetically operated valve 52. This valve 52 is normally in the closed position, in which the pressure is relieved from the carbon elements 30 and 32, enabling them to assume the above-mentioned separated position. The valve 52 is opened at the beginning of a welding cycle, producing, first, a movement of the carbon elements into contact with each other at a relatively low pressure, and thereafter increasing pressure between these elements to a desired maximum value. As will be understood, when the pressure between these elements is at the minimum value, the resistance of the welding circuit is at a maximum and when this pressure is at its maximum value, the resistance to the welding circuit is at a minimum value. The rates of increase and decrease of the pressure between the engaged carbon elements are adjustable, and the minimum and maximum pressures are also adjustable. This allows accurate control of the rate of increase in the welding current from the minimum to the maximum value and similarly allows accurate control of the rate of decrease of this current. Similar control of the maximum and the minimum welding current values is afforded.

In the broader aspects of the invention, any suitable control system may be provided to control the energization and de-energization of the coil 54. The herein illustrated system is energized from a suitable source L1'—L2', which may be energized from the battery unit or otherwise, as will be understood. The system employs a pair of electric valves V1 and V2, which may be of any usual type, but are preferably of the three-element evacuated type. Each of the valves comprises an anode $a$, a control grid $g$, and an emissive cathode $c$, the heating circuit for which may be conventionally arranged and is omitted from the diagram in the interest of simplicity. The valves V1 and V2 are provided with associated electromagnetically operated relays R1 and R2 provided, respectively, with contacts R1$a$ and R1$b$ and contacts R2$a$ and R2$b$.

It is thought that the remaining details of the system may best be understood from a description of the operation of the system as a whole. Assuming it is desired to effect a welding operation, the system may be conditioned for operation by closing the line switches LS and LS', thereby energizing the line conductors L1—L2 and L1'—L2'. The former action energizes transformer T and assuming the disconnect switch S is closed, enables it to supply charging current to the battery unit B, which action brings the battery unit to a predetermined charge at a suitably determinable rate. Closure of the switch LS' completes an energizing circuit for the primary winding of transformer T5, which is associated with the grid of valve V2. Upon completion of this circuit, transformer T5 supplies charging current to the timing condenser C4, and consequently applies a blocking potential to the grid of valve V2, which prevents passage of current through this valve.

Assuming it is desired to effect a welding operation, the work W may be properly positioned between the electrodes and thereafter the illustrative pilot switch P may be closed. Closure of switch P completes an obvious energizing circuit for the primary winding of transformer T1, associated with the anode circuit of valve V1. Under the conditions stated, transformer T2, associated with the grid circuit of valve V1, is de-energized and such grid is, consequently, at a conducting potential. The energization of transformer T1, consequently, causes current to flow, during half cycles in which the anode $a$ is positive, through valve V1 and energizes relay R1. Upon being so energized, relay R1 closes its normally open contacts R1$a$ and R1$b$.

Closure of contacts R1$a$ completes a holding circuit in parallel to the pilot switch P, which may thereupon be released to the open position without interrupting the just initiated welding cycle. Closure of contacts R1$b$ completes an obvious energizing circuit for the solenoid of the usual electromagnetically operated valve 61, associated with the means for causing the electrodes 10 and 12 to engage the work. This movement of the electrodes, as will be understood, places the system in readiness for the initiation of flow of welding current through the work.

Closure of contacts R1$b$ also completes obvious energizing circuits for the primary windings of transformers T3 and T4, associated, respectively, with the anode and grid circuits of valve V2. In view of the blocked condition of valve V2, the energization of transformer T3 is without immediate effect. The energization of transformer T4 introduces into the grid circuit of valve V2 a potential which opposes the potential of transformer T5 and enables all or a part of the energy stored in condenser C4 to discharge through the associated local circuit including the resistor $r2$. After a period determined by the characteristics of this discharge circuit, the potential of the grid of valve V2 falls to a conducting value and enables transformer T3 to pass current through valve V2 and energize relay R2. As described below, the energization of relay R2 initiates the flow of welding current and it will be understood, therefore, that the just-mentioned timing interval is relatively short, but is long enough to insure that the electrodes 10 and 12 are in properly clamped relation to the work before the flow of welding current is initiated.

Upon being energized, as aforesaid, relay R2 closes its normally open contacts R2$a$ and R2$b$. The latter contacts energize relay R4, which thereupon opens its back contact R4$a$ and closes its front contact R4$b$. The former action is without effect since contact R3$a$ is now open, but the latter action energizes relay R3. Upon being energized, relay R3 closes a self-holding contact R3$b$ and also closes its contact R3$a$, which action is without effect, since contact R4$a$ is now open. This sequencing of relays R3 and R4 is preparatory to the resetting operations which take place at the completion of the weld.

Closure of relay contact R2$a$, as aforesaid, completes an obvious energizing circuit for the coil 54 associated with the contactor valve 52, which circuit is subject only to the now closed back contact R5$a$ of relay R5. Valve 52 may be and preferably is a usual three-way valve, which in its normal off position connects its outlet 56 (which continuously communicates with the contactor) to the exhaust line 58, and disconnects its inlet 60. In the energized position of valve 52, on the other hand, passage 58 is disconnected from the outlet and inlet 56 and 60 and these parts are connected together. Inlet 60 is continuously connected through a flow controlling needle valve 62, a surge tank 63, and a pressure controlling regulator valve 64, to a suitable source 66 of compressed air.

Upon being energized, accordingly, valve 52 connects the contactor to the source 66 through the regulator 64, which source is thereupon effective, as described below, to move the carbon elements 30 and 32 into initial engagement with each other at a predetermined and preferably relatively low pressure. This action, as will be obvious, completes the welding circuit through leads 38 and 40, under which conditions the contactor represents a relatively high resistance in the circuit, enabling the flow of a minimum value of welding current. This minimum value of welding current may be, for example, of the order of 1% to 2% of the normal or full load value of welding current. As is also described in more detail below, the energization of valve 52 results in the energization of a three-way valve 70, which thereupon becomes effective, through a rate controlling needle valve 72, a surge tank 73, and a pressure controlling regulator valve 74, to complete an additional connection between the contactor C and the source of supply 66. This action results in increasing the pressure between the carbon elements 30 and 32 from the aforesaid minimum value to a maximum value, which maximum value and the rate of increase thereto, are both controllable.

The increase in pressure between the carbon elements correspondingly reduces the resistance of the welding circuit and correspondingly increases the value thereof.

In the broader aspects of the invention, definite time delay or other suitable means may be used to determine the over-all length of the welding period. As aforesaid, however, it is preferred to determine the welding period by means which responds to the temperature of the work, which means is illustrated as comprising the thermocouple elements 14 and 16 and the pyrometer Py.

The flow of welding current through the electrodes and the work raises the temperature thereof and causes the thermoelectric potential between the elements 14 and 16 to rise, as will be understood. When this thermoelectric potential rises to a predetermined value corresponding to a completed weld, the previously mentioned pyrometer Py operates to apply an operating potential to the coil of relay R5, which thereupon opens its contacts R5a and R5b.

The opening of contact R5a opens the previously traced circuit for winding 54, which action, as described below, disconnects the contactor C from the source of supply 66 and connects it to exhaust. This action causes the pressure on the carbon elements 30 and 32 to be decreased at a predeterminable rate. The reduction in pressure again progressively increases the resistance of the welding circuit from its minimum to a maximum value and ultimately enables the carbon elements to separate, interrupting the welding circuit and terminating the flow of welding current.

The above actions cause a reduction in temperature of the work and a consequent reduction in the thermoelectric potential. However, condenser C5, associated with relay R5, retains this relay in the energized position long enough to effect the resetting of the system, as hereinafter described. The opening of contact R5b interrupts the energizing circuit for transformer T3, which action immediately de-energizes relay R2 and results in the reopening of contact R2a, thus providing an additional interruption in the circuit of the valve solenoid 54.

The interruption of the welding circuit also de-energizes (at contact R2b) relay R4, which thereupon resumes the normal position, reclosing its contact R4a and reopening its contact R4b. The reopening of the latter contact is without immediate effect because of the self-holding circuit for relay R3, afforded by contact R3b. The reclosure of contact R4a completes, through the now closed contact R3a, an energizing circuit for the winding of transformer T2.

Upon being energized, transformer T2 supplies charging current to condenser C2 and also applies a blocking potential to the grid of valve V1, which action immediately renders this valve non-conducting. Upon being rendered non-conductive, valve V1 interrupts the further flow of current to relay R1, which relay, however, remains in the energized position for a predetermined "hold time" determined by the characteristics of the associated condenser C1. It will be understood that this "hold time" is sufficiently long to insure the setting of the work before the pressure is relieved from the electrodes.

At the expiration of the just-mentioned period, relay R1 resumes the de-energized position and reopens its contacts R1a and R1b, which latter action de-energizes the previously mentioned solenoid operated valve 61, thereby effecting the release from the work of the electrodes and completing the welding cycle.

The other operations produced by the reopening of contacts R1a and R1b are resetting operations. More particularly, the opening of contacts R1a de-energizes transformer T1, which action is without immediate effect in view of the now blocked condition of the valve V1. The opening of contact R1b interrupts the circuit for relay R3, causing this relay to resume its normal position; interrupts the energizing circuit for transformer T4, thereby enabling transformer T5 to again apply a blocking potential to the grid of valve V2; and introducing a further interruption into the circuit of transformer T3, which serves to maintain this transformer in the de-energized condition after relay R5 times out, recloses its contacts R5a and R5b, which actions are consequently without effect and may take place at any time after the de-energization of relay R1.

The re-opening of relay contact R3a interrupts the energizing circuit for transformer T2, which action enables the energy stored in condenser C2 to discharge through the local circuit including resistor r1. At the expiration of a period determined by the characteristics of this discharge circuit, the grid of valve V1 resumes a conducting valve, thereby enabling a re-energization of relay R1 in response to a reclosure of the pilot switch P. Until the expiration of this period, however, usually referred to as the "off time," a reclosure of pilot switch P is ineffective to energize relay R1, and condenser C2, therefore, serves to determine the interval which must elapse between successive welding operations. In accordance with usual practice, a throw-over switch S" may be provided, which, upon being closed, renders valve 61 and the other starting circuits directly responsive to the pilot switch P. Under these conditions, as will be understood, a new welding cycle may be initiated in response to closure of pilot switch P, immediately after the expiration of the hold-time period afforded by condenser C1.

Shortly after relay R1 resumes the de-energized position, condenser C5 times out, allowing contacts R5a and R5b to resume their illustrated positions, without effect.

Referring now particularly to Figs. 4 through 11, the carbon elements 30 and 32 are carried, respectively, by plates 100 and 102 which, like their associated carbons, may be and preferably are of generally cylindrical shape. These members are preferably formed of copper or other highly conductive material and are provided, respectively, with the previously mentioned radial extensions 34 and 36, which function as terminals for connection to the welding circuit. Preferably, the carbon elements are bonded to their respective plates 100 and 102, and if desired and as shown, the connections between these parts may be further protected by a series of clips 104 and 106, which are secured to the respective plates in circumferentially distributed relation therearound, and overlap the tapered edges of the corresponding carbon elements.

The lower plate 102 is rigidly secured to, but is insulated from, a base member 108, by means of a plurality of circumferentially distributed studs 110. The plate 100 is similarly rigidly secured to, but is insulated from, the vertically slidable piston member 112, by means of a plurality of circumferentially distributed studs 114. A plurality of springs 116 are interposed between the plate 100 and a corresponding plurality of adjusting screws 118, which screws are carried by the base 108. These springs continuously urge and normally hold the piston 112 in the position shown in Fig. 5, in which the carbon elements 30 and 32 are separated from each other, and in which position, as described above, the contactor is effective to interrupt the welding circuit.

The piston 112 is vertically slidable within a downwardly presenting cylinder space 120, provided at the base of the cylinder member 122. Member 122 is rigidly secured to the base 108, by a plurality of circumferentially distributed studs 124 and cooperating sleeves 126.

The upper portion of cylinder member 122 affords a reservoir 128 for the hydraulic fluid utilized to apply the proper pressure between the carbon elements. This fluid may be and preferably is oil. Reservoir 128 is provided with a usual filler tube 130 and a gauge 132 and is normally filled to approximately the level shown in the figures. Communication between the reservoir 128 and the cylinder space 120 is afforded through a series of circumferentially distributed openings 134 in a sleeve 136, which is press fitted or otherwise rigidly secured into the central passage through the intermediate web portion 138 in the cylinder member 122.

Cylinder member 122 is surmounted by a booster cylinder 140, which is secured to the former by a plurality of circumferentially distributed studs 142. The booster cylinder 140 slidably receives a piston 144, which is continuously urged to and is normally retained in the illustrated upper position by means of a relatively heavy compression spring 146. Spring 146 is seated between the piston 144 and the web 138. In the illustrated upper position, piston 144 abuts the underside of an annular boss 148 provided at the underside of the associated cylinder space, leaving an annular cylinder space 150 into which an elastic fluid, in this case air, is introduced through the hereinafter described air circuit.

A tubular piston member 152 is rigidly secured to the piston 144 and normally projects into the previously mentioned sleeve 136 to the position shown in Fig. 5, in which position the supply openings 134 are exposed. It will be understood, however, that in response to the introduction of air into the cylinder space 150, piston 144 is forced downwardly, carrying with it the member 152. The latter movement closes off the openings 134 and traps a body of oil in the lower part of the sleeve 136 and in the cylinder space 120, through which body the pressure is transmitted to the piston 112 and the carbon elements 30 and 32.

The upper part of the booster cylinder 140 defines an auxiliary air cylinder 160, which slidably receives an auxiliary piston 162. Piston 162 carries a piston rod 164, which slidably projects through the piston 144 and the tubular piston member 152, and the lower end whereof normally bears against a wear plate 166 provided on the upper surface of the main piston 112. The return springs 116 act through piston 112 and the piston rod 164 to normally maintain piston 162 in its illustrated upper limit position, which position is adjustably determined by an adjustable stop member 168. Stop 168 is threaded into the removable cover 170, associated with cylinder 160, and is provided with an upwardly extending shank 172, by which it may be turned to a desired position, to correspondingly determine the normal free spacing between the carbon elements 30 and 32.

The cover 170 is provided with an upwardly extending boss 180, to which the outlet 56 of the previously described valve 52 is secured by means of the collar 182. The cover 170 is also provided with a passage 184, which continuously connects the valve outlet 56 to the cylinder space 186 provided between the piston 162 and its associated cylinder 160. Referring particularly to Figs. 7 and 8, the cover 170 is also provided with a laterally extending boss 190, having a counterbore 192 in the outer end thereof. The boss 190 is provided with a passage 194, which directly communicates with the main air passage 184. The end of the passage 194 receives an adjustable needle valve 196, which controls the flow of air between passage 194 and the counterbore 192. The counterbore 192 has an outlet passage 204, which, in turn, is connected by pipe 206 to the operating inlet of the previously mentioned supplemental valve 70, shown in detail in Fig. 10.

Referring particularly to Fig. 10, valve 70 comprises a generally cylindrical body 210, within which a valve seat 212 is secured by the removable nipple 214. The nipple 214, the seat 212 and the valve body 210 cooperate to define two chambers 216 and 218, communication wherebetween is normally prevented by a poppet type valve element 220. Valve element 220 is normally maintained seated by the pressure continuously applied against the face thereof through the line 222. As described in connection with Fig. 1, line 222 is continuously connected to the source 66 of compressed air through the control valves 72 and 74.

Valve element 220 is fixedly secured to a cooperating valve element 224, having a dome-like surface 226 for cooperation with a seat 228 provided therefor at the lower side of the member 212. In the normal position of the parts, shown in Fig. 10, the valve chamber 218 is continuously connected to the exhaust passage 230 through the lower end of the member 212.

The means for actuating valve elements 220 and 224 comprises a piston 232, which is slidably received in a sleeve 234 threaded into the lower end of the valve body 210. A light compression spring 236 is seated between the end of the piston 232 and the sleeve cover 238 and serves only, as will be understood, to maintain the upper end of the piston in continuous engagement with the lower end of the valve element 224.

The valve chamber 218 continuously communicates with a line 240, which continuously communicates through passages 242 and 244 with the previously described cylinder space 150, associated with the booster piston 144. Such cylinder space is thus normally connected to exhaust through the exhaust opening 230 of valve 70 and, as shown, a rate controlling needle valve 231 may be provided to control the rate of flow through this exhaust circuit.

As will be recalled from previous description, the main valve 52 is normally de-energized, which action connects the outlet 56 thereof to exhaust through the exhaust passage 58, and isolates the inlet 60. Under these conditions, passage 184 and cylinder space 186 are connected to exhaust, enabling the springs 116 to maintain the associated piston 162 in its illustrated position in which the carbon elements 30 and 32 are spaced apart from each other and are, consequently, effective to interrupt the welding circuit. Since passage 184 is connected to exhaust, the supplemental valve 70 is maintained closed by the pressure in line 222, and, consequently, the cylinder space 150 is connected to exhaust through the circuit afforded by valve 70.

As described before, the initiation of a welding operation results in energizing valve 52, which thereupon connects the main supply passage 184 to the source 66 through the regulating valves 62 and 64 (Fig. 1). In response to this action, air is introduced at a desired pressure to the cylinder space 186, and to the passage 194, associated with the needle valve 196. The pressure introduced into cylinder space 186 builds up therein at a rate determined by the needle valve 62, and ultimately attains a value sufficient to overcome the return springs 116 and move the carbon elements 30 and 32 into initial engagement with each other. Thereafter, the pressure builds up in space 186 to the minimum pressure value determined by valve 64. In this case, the pressure is applied to the carbon elements through the main piston 112, the piston rod 164 and the piston 162. The parts are preferably so adjusted so as to enable this minimum pressure to build up relatively rapidly and to produce a resultant pressure between the carbon elements, which enables the flow between 1% and 2% of the normal full load welding current.

The above-described action is illustrated in Fig. 2, it being assumed that the control valve 52 is closed at the time $t_0$, at which time the carbon elements are separated. At this time, the welding circuit resistance, represented by the curve Rc, is at an infinite value, and the pressure between the carbon elements, represented by the curve Pc, is at a zero value. At the time $t_1$, after the carbon elements 30 and 32 initially engage each other and the minimum pressure is attained in space 186, the pressure between the carbon elements attains a normal or starting value 260, and the welding circuit resistance attains the normal or starting value 262.

During the build-up of pressure in space 186, air passes through the needle valve 196 into the cylinder space associated with piston 232 of valve 70, and ultimately sufficient pressure builds up therein to open valve 70. It will be understood that valve 196 may be adjusted to cause valve 70 to open either prior to, simultaneously with, or after the pressure between the carbon elements 30 and 32 has attained the value determined by regulator valve 64. Preferably, this action occurs not earlier, but substantially simultaneously with, the attainment of such pressure. The opening of valve 70 isolates the exhaust passages 230, and connects line 240 to the inlet 222. This action connects the booster cylinder space 150, associated with the booster piston 144, to the source 66 through valves 74 and 72, line 222, valve 70, line 240 and passages 242 and 244.

The resultant pressure in cylinder space 150, which builds up at a rate determined by valve 72, overcomes the effect of return spring 146, and forces piston member 152 downwardly. During the initial downward movement of piston member 152, oil is forced outwardly through the openings 134 into the reservoir space 128, without causing any material increase in the pressure applied to the main piston 112. As soon, however, as the lower end of piston member 152 closes off the openings 134, the previously described body of oil is trapped above the main piston 112. At this time, the pressure applied to the piston 112 rises to a value determined by the then existing pressure in cylinder space 150 and by the ratio between the areas of pistons 144 and 152, on the one hand, and the ratio between the areas of pistons 152 and 112, on the other hand. The pressure applied to the piston 112 continues to rise at a rate determined by the needle valve 72 and ultimately attains a value determined by the setting of the regulator valve 74. This progressive increase in pressure applied to piston 112 and, consequently, to the carbon elements 30 and 32, brings the pressure curve Pc to a value 264, at a time $t_2$, and correspondingly brings the circuit resistance to a value 266, which value corresponds to a maximum flow of welding current. As will be appreciated, the time elapsing between the times $t_1$ and $t_2$ in Fig. 2, as well as the values 264 and 266, are variable in accordance with the setting of valves 72 and 74. This variation in the rate of increase in the welding current enables the preheating effect previously described.

It will be noted that by reason of the booster system, a pressure in cylinder 150, which is lower than the pressure in cylinder 186, is enabled to produce a pressure between the carbon elements 30 and 32, which is materially greater than the initial pressure produced by the action of piston 162. For example, utilizing relative piston areas, as shown, a 90# setting of regulator valve 64 is appropriate for a range of settings of valve 74 between 30# and 80#, depending upon the desired maximum current flow.

It is noted that Fig. 9 illustrates the positions of the parts at the time $t_1$ in Fig. 2, and that Fig. 11 illustrates the physical positions attained by the parts at the time the piston 152 has closed off the exhaust passages 134. The latter position is, of course, maintained throughout the final increases in pressure.

The conditions corresponding to the time $t_2$ in Fig. 2 are maintained so long as valve 52 is maintained in the energized condition, during which the maximum welding current flows to and through the work. As described in connection with Fig. 1, this maximum flow of welding current brings the work to a welding temperature and actuates the thermoelectric elements, which thereupon function to de-energize the valve. As soon as valve 52 is de-energized, the main air inlet passage 184 is connected to the exhaust passage 58 through the needle valve 80. It is usually preferred to maintain this needle valve in a wide open condition and, as a consequence, the pressure is quickly relieved from piston 162. This action, which occurs at the time $t_3$ in Fig. 2, initiates a reduction in the pressure between the carbon elements, as indicated at 270, and, consequently, initiates an increase in the resistance of the welding circuit, as indicated at 272.

In response to the exhausting of passage 184, the pressure applied to the piston 232 of valve 70 decreases to a value below that required to maintain valve 70 in the open position. As shown, the exhausting of the pressure applied to piston 232 takes place through the needle valve 196. If it is desired to insure a more prompt reclosing of valve 70 than is afforded by this exhaust circuit, the modification shown in Fig. 12 may be utilized, in which a usual ball check valve 197 is connected, by lines 199 and 201, directly in parallel with the needle valve 196. It will be noted that this check valve remains closed during the building up of pressure against piston 232, but is substantially free to open and permit an unrestricted decay of pressure as soon as the main valve 52 is de-energized.

When valve 70 recloses, valve element 220 isolates cylinder space 150 from the source 66, and connects this cylinder space to exhaust through the passage 230. As shown in Fig. 10, passage 230 has associated with it a rate controlling needle valve 231, which, as will be understood, may be adjusted to desirably control the rate at which air is exhausted from the cylinder space 150.

As the pressure in cylinder 150 decreases, the pressure between the carbon elements is correspondingly decreased, and the resistance of the welding circuit is correspondingly increased. Ultimately, a pressure in cylinder space 150 is reached, at which piston 144 is unable to overcome the biasing effect of spring 146, at which time piston member 152 and piston 144 are returned to the starting position shown in Fig. 5. During the course of this decrease in air pressure, also, a point is reached, represented by the time $t_4$ in Fig. 2, at which the return springs 116 are enabled to separate the carbon elements 30 and 32, thereby interrupting the welding circuit, and, through the main piston 112, restore piston 162 to the starting position shown in Fig. 5.

Referring particularly to Fig. 2, it will be noted that if the welding circuit were entirely non-inductive, the current in the welding circuit would immediately rise from a zero value to a value 274 at the time $t_1$, would thereafter rise at the rate indicated at 276, and would attain its maximum values at the time $t_2$. By virtue of the inductive character of the welding circuit, however, the welding current rises at the rate indicated by the full line curve portion $s'$ and thereafter flows at the maximum value represented by the portion $s$ of the curve. Also, if the welding circuit were non-inductive, the current I would decrease as indicated by the dotted portion 278 of the curve, such decrease being initiated at the time $t_3$. By virtue of the inductive character of the circuit, however, the decrease in current lags the decrease in pressure between the carbon elements and, consequently, if the carbon elements were allowed to separate too promptly following the de-energization of the main valve 52, the welding current would be at a value in excess of the desired minimum value at such time of separation. The amount of this excess would vary with variations in the character of the welding circuit. However, by adjusting needle valve 231, so as to provide a sufficiently gradual decay of pressure in cylinder space 150, the welding current is enabled to decay to a safe minimum value before the carbon elements are allowed to separate. Bearing in mind, as above stated, that current magnitudes of the order of 30,000 to 50,000 amperes may be involved, the importance of this feature will be readily appreciated. In all cases, and particularly in cases involving such high current values, it is preferred to set the opening rate of the contactor, in relation to the characteristics of the work circuit, so as to bring the current to a value which is a minor fraction of the maximum current value, immediately prior to the separation of the carbon elements. By way of example, it is preferred to limit such minimum current to a figure not in excess of 5% of the maximum current value.

Summarizing the above system, accordingly, it will be appreciated that, generically, it involves initially closing the welding circuit, increasing the value of welding current from a starting value to a desired maximum value at a rate which is adjustable and is consistent with the requirements of the work being welded, initiating a decrease in the value of the welding current at the conclusion of the weld, and maintaining the continuity of the circuit until the current has decayed to a sufficiently low value to enable the circuit to be safely interrupted. The rate of decrease of current may be the same or different than the rate of increase, and depending upon the relation between the relative adjustments of the supply and exhaust circuits, may be the same or different than the initial, or starting, minimum value of current flow.

In certain instances, for example, in seam welding operations, it may be desirable to modulate the current, so as to provide a succession of pulsations. This may be done, of course, by actuating the control system so as to produce a succession of cycles, as shown in Fig. 2, without allowing the pressure to be relieved from the electrodes in the intervals between successive pulses of current. Alternatively, and preferably, the current is not interrupted in the intervals between successive pulsations, but instead is merely reduced to a relatively low value, in the manner depicted in an illustrative sense in Fig. 3. In this figure, the contactor is initially actuated at the time $t_0$, resulting, as before, at the time $t_1$ in bringing the carbon elements into contact with each other and establishing the minimum pressure therebetween. As before, the pressure between the carbon elements is thereafter increased to the maximum value shown by the curve Pc'. After a predetermined period, the pressure is gradually reduced to a value Pc''. The complete cycle involves a desired succession of maximum pressure periods Pc' separated by minimum pressure periods Pc''. The final reduction of the pressure between the carbon elements and the separation thereof takes place as described in connection with Fig. 2. The succession of high and low pressure periods produces corresponding low and high resistance periods Rc' and Rc'', which, in turn, correspond to successive periods of maximum and minimum current flow I' and I''.

Various control systems may be utilized to provide the cycle of Fig. 13. In Fig. 14, the arrangement for controlling the application to and relief of pressure from the various components of the contactor C' are arranged as described in connection with Figs. 1 through 11, with the exception that the valve 70', which corresponds to the previously described valve 70, is actuated from its normally closed position to the open position by means of a solenoid 300. With this arrangement, it will be appreciated that a cycle of the type shown in Fig. 13 may be produced as follows:

As before, valve 52 is energized at the beginning of the cycle and remains energized until the time $t_3$ in Fig. 13. Shortly after the energization of valve 52, solenoid 300 is energized to open valve 70', the timing between valves 52 and 70' being preferably the same as previously described in connection with valves 52 and 70. The actuation of valve 70' brings the pressure between the carbon elements to the initial maximum value and correspondingly results in increasing the current to the initial value. Thereafter, and while valve 52 remains energized, valve 70' is successively de-energized and energized. Following each de-energization of valve 70', which de-energizations take place at the times $t_4$ and $t_5$, the contactor pressure falls gradually to the minimum value. The intermediate re-energizations of valve 70', which take place at times $t_6$ and $t_7$, result in again building up the pressure to the maximum value. The final de-energization of valve 70' takes place at the time $t_8$, simultaneously with the de-energization of valve 52, terminating the cycle in the manner described in connection with Fig. 2.

As thus far described, it will be noticed that, as before, valve 70' discharges through the needle valve 231. The minimum pressure values $Pc''$ are, consequently, the initial or minimum contactor pressure established through valve 52 and contactor piston 162 (Fig. 5). In many cases, it may be preferred to provide minimum contactor pressures for the periods between successive pulsations, which differ from the minimum pressure established by piston 162. In such cases, the further arrangement also shown in Fig. 14 may be utilized. As shown, needle valve 231 is connected to two exhaust lines 302 and 304, respectively. Line 302 is controlled by a two-way solenoid-operated valve 306, which is normally open and which may be actuated to the closed position by energizing its solenoid 308. Solenoid 308 is connected directly in parallel with the solenoid 54, associated with valve 52.

The connection between valve 231 and the other exhaust line 304 is controlled by a check valve 310, a surge tank 312 and a relief valve 314. It will be appreciated that valve 314 may be set to correspond to any desired minimum pressure $Pc''$, having a value between the minimum pressure established by piston 162 and the maximum value $Pc'$. When valve 70' is de-energized, at the time $t_4$, for example, the pressure applied to the booster piston 150 is enabled to exhaust through the circuit comprising valve 70', needle valve 231, check valve 310, tank 312 and relief valve 314, until such time as the pressure against piston 150 falls to the value for which valve 314 is set. As before, the discharge rate is controlled by needle valve 231. At the end of the cycle, all of valves 52, 70' and 306 are simultaneously de-energized, at the time $t_8$ (Fig. 13). The check valve 310 serves to maintain the desired minimum pressure in tank 312, and the opening of valve 306 enables the air acting against piston 150 to exhaust freely to atmosphere.

In the broader aspects of the invention, any suitable pulsation timer may be utilized to provide the above sequencing of valves 52, 70' and 306. The system shown diagrammatically in Fig. 14 is, consequently, to be regarded as illustrative only. This control system comprises a motor 320, which drives through a suitable coupling, a series of three drums 322, 324 and 326. The drum 322 carries two conducting segments 328 and 330, which are continuous, except for short insulated sections 332 and 334. Segments 328 and 330 are continuously connected across the source L1' and L2' and cooperate, respectively, with brushes 336 and 338. In the normal off position of the system, brushes 336 and 338 engage the insulated sections 332 and 334 and, consequently, the associated circuits for valves 54 and 308 are interrupted.

The drum 324 is provided with a pair of contact rings which, respectively, are divided into three conducting segments, such as 340 and 342, by corresponding pairs of insulated sections 346 and 348. The individual conducting segments 340 and 342 are continuously connected to the respectively opposite sides of the source and cooperate with a pair of brushes 350 and 352. Brushes 350 and 352, in turn, directly control the circuit for valve 70'. As will be obvious, the division of each conducting ring into three successive segments makes provision for a welding cycle having three successive pulsations, the relative lengths of the high and low pressure periods being determined by the relative lengths of the conducting segments and the insulating sections. Larger or smaller numbers of pulsations may, of course, be provided by correspondingly altering the number of conducting segments.

In the normal position of the parts, brushes 350 and 352 are in engagement with a pair of insulating segments 346 and 348 and, consequently, the circuit for valve 70' is normally interrupted.

The remaining drum 326 comprises a pair of directly interconnected conducting rings 360 and 362, which are continuous except for short insulated sections 364 and 366. These rings cooperate with brushes 368 and 370 to effect certain of the hereinafter described resetting operations and, in the normal position of the parts, these brushes engage the insulated sections.

To initiate a welding cycle, as shown in Fig. 13, the illustrative pilot switch P' may be closed, which directly completes an obvious energizing circuit for the driving motor 320, and also completes a circuit through which relay 372 is energized. Upon being energized, relay 372 closes its contact $a$, thereby preparing a maintaining circuit for the motor 320, which circuit is, however, subject to the drum 326. As soon as the motor 320 has rotated drum 326 far enough to bring the rings 360 and 362 into engagement with the brushes 368 and 370, the above maintaining circuit is completed, enabling the pilot switch P' to be released to the open position without affecting the cycle.

The initial rotation of drum 322 by motor 320 brings rings 328 and 330 into engagement with brushes 336 and 338, respectively, which actions energize valve solenoids 54 and 308. In response to this action, these solenoids open valves 52 and 306. The energization of valve 52 results in bringing the carbon elements of the contactor into engagement at a minimum pressure, as previously described. The actuation of valve 306 closes off the normal exhaust circuit for valve 70' and renders the flow of exhaust air through this valve subject to the relief valve 314.

Shortly after the energization of valves 52 and 306, the rotation of drum 324 brings the initial pair of conducting segments 340 and 342 into engagement with brushes 350 and 352. This action, which is delayed only long enough to provide the proper timing between the applications of pressure to pistons 162 and 150 (Fig. 5), completes an obvious circuit for energizing the solenoid 300, associated with valve 70'. As a consequence, and as previously described, pressure is applied to piston 150, thereby building up the contactor pressure to the initial maximum value and correspondingly increasing the welding current. At the time designated $t_4$ in Fig. 13, a pair of insulating segments 346 and 348 on drum 324 move into engagement with brushes 350 and 352, thereby interrupting the circuit for valve 70', resulting in the opening of this valve. This action initiates a gradual reduction of the contactor pressure to the initial minimum value $Pc''$. The rate of decrease in pressure, as before, is controlled by needle valve 231, and the minimum pressure value is determined by the relief valve 314. At the time designated $t_5$ in Fig. 13, the next pair of conducting portions 340 and 342 on drum 324 are brought into engagement with brushes 350 and 352, which action again energizes valve 70' and causes the pressure to again build up to the maximum value. The succeeding operations taking place at the times $t_5$ and $t_7$ in Fig. 13 correspond to those described in connection with times $t_4$ and $t_6$.

At the time $t_3$ in Fig. 13, the insulating portions 332 and 334 on drum 322 are brought into engagement with brushes 336 and 338, and the final pair of insulating portions 346 and 348 on drum 324 are brought into engagement with brushes 350 and 352. These actions substantially simultaneously de-energize valves 52, 70' and 306, and result in the gradual decay of and final interruption of the welding current in the previously described manner.

The above operations may take place when motor 320 has caused the drums 322, 324 and 326 to substantially complete a full revolution, and at any time thereafter, the parts may be adjusted to bring the insulating portions 364 and 366 on drum 326 into engagement with brushes 368 and 370. As soon as this action occurs, the energizing circuit for relay 372 is interruped. At this time, relay 372 resumes the de-energized position, interrupting the circuit for motor 320. This action, as will be obvious, bring the drums to rest in the illustrated positions.

It will be appreciated that the battery unit described in connection with the above systems, affords a very satisfactory source of power for arc welding equipment, it being understood that power for such equipment may be taken directly from the batteries without being subject to control by the contactor mechanism. The present stored energy system thus affords a convenient means of providing a combination resistance and arc welding equipment.

Although only a single specific embodiment of the invention has ben described in detail, it will be appreciated that various changes may be made therein without departing from the spirit and scope thereof.

What is claimed is:

1. A direct current welder comprising an energy storage apparatus capable of storing at one time sufficient energy to make a plurality of welds and of delivering said energy to a welding circuit in the form of direct current energy, said apparatus being adapted for association with electrodes engageable with work, and through which the work may be supplied with said welding current, electrical conductors for connecting said electrodes and said storage apparatus in a welding circuit, said conductors being free of electrical inductance except for the inherent self-inductance thereof, a substantially noninductive circuit controlling means controlling flow of current through said circuit, said controlling means being operable in a first operative condition to permit full welding current to flow through said circuit and said electrodes and work, said controlling means being operable in a second operative condition to provide resistance to current flow through said circuit greatly in excess of the normal resistance of said conductors and said electrodes and work whereby the flow of current through said circuit is reduced to a minor fraction of said normal welding current, said controlling means being operable in a third operative condition to interrupt current flow through said circuit, and means to actuate said controlling means from said first condition to said second condition and automatically operable at the expiration of a predetermined time interval subsequent to the actuation of said controlling means out of said first condition to actuate said controlling means into said third condition, said time interval being so related to the inherent self-inductance of the welding circuit that substantially all of the inductively stored energy in said circuit is dissipated prior to the interruption of said current flow.

2. A direct current welder comprising an energy storage apparatus capable of storing at one time sufficient energy to make a plurality of welds and of delivering said energy to a welding circuit in the form of direct current energy, means including conductors electrically connected to said apparatus and operable to apply welding current to a workpiece, a regulating means interposed in said conductors for regulating flow of current through the welding circuit afforded by said source means, work and regulating means, said regulating means having a first current-regulating condition in which a minimum value of resistance is inserted in said circuit whereby said welding current flows through said circuit and having a second current-regulating condition in which a greater value of resistance is introduced into said circuit, said regulating means having a third condition in which it interrupts said circuit, a first controlling means for said regulating means for automatically determining the length of time said regulating means is maintained in said first condition and therefore the length of time welding current flows, and a second controlling means actuated as a consequence of the actuation of said first controlling means for actuating said regulating means from said first condition through said second condition and into said third condition, said second controlling means including means to so time the actuation of said regulating means to said third condition, that the current flow through said circuit is reduced to a minimum value which is a minor fraction of said welding current, and substantially all the inductively stored energy of said circuit is dissipated, prior to said interruption.

3. A direct current welder comprising an energy storage apparatus capable of storing at one time sufficient energy to make a plurality of welds and of delivering said energy to a welding circuit in the form of direct current energy, means including conductors electrically connected to said apparatus and operable to apply welding current to a workpiece, a regulating means interposed in said conductors for regulating flow of current through the welding circuit afforded by said source means, work and regulating means, said regulating means having a first current-regulating condition in which a minimum value of resistance is inserted in said circuit whereby said welding current flows through said circuit and having a second current-regulating condition in which a greater value of resistance is introduced into said circuit, said regulating means having a third condition in which it interrupts said circuit, a first controlling means for said regulating means for automatically determining the length of time said regulating means is maintained in said first condition and therefore the length of time welding current flows, and a second controlling means actuated as a consequence of the actuation of said first controlling means for actuating said regulating means from said first condition through said second condition and into said third condition, said second controlling means including means to so time the actuation of said regulating means to said third condition, that the current flow through said circuit is reduced to a miniumum value which is a minor fraction of said welding current, and substantially all the inductively stored energy of said circuit is dissipated, prior to said interruption said first controlling means being so constructed and arranged to control the time of flow of said welding current independently of the timing function of said second controlling means whereby the rate of current reduction through said circuit is independent of the length of time of flow of said welding current.

4. A direct-current electric welding mechanism comprising an electric storage battery apparatus providing a source of electrical energy, for association with electrodes engageable with work and through which the work may be supplied with welding current, electrical conductors and control mechanism therein for connecting said electrodes and said source so as to form a welding circuit, control means associated with said control mechanism and operable to actuate the same to complete said circuit whereby a maximum or welding current flows through the work and to thereafter introduce resistance into said circuit and finally interrupt said circuit and terminate the flow of welding current, said control means including a preset first timing means for determining the interval of time that said maximum value of welding current flows, and for initiating said introduction of resistance at the expiration of said interval, said control means further including a preset second timing means which determines the interval of time which intervenes between said introduction of resistance and said interruption of the circuit, said control mechanism including means to introduce a sufficient resistance into said circuit prior to said interruption to reduce the current in said circuit to a value which, under steady state conditions is a minor fraction of said maximum value the timing interval determined by said second timing interval being sufficient, in relation to the inductance of said circuit to delay said interruption until said current has fallen to substantially said minimum value, and adjusting means operably associated with said first timing means for varying its timing interval without affecting the timing interval determined by said second timing means.

5. A direct-current welding mechanism comprising an electric storage battery apparatus as the source of electrical energy, for association with electrodes engageable with work and through which the work may be supplied with welding current, means including electrical conductors and a rheostatic contactor for completing a welding circuit between said battery apparatus and said electrodes, said contactor mechanism being normally effective to interrupt said circuit, control means for actuating said contactor mechanism to complete said circuit and interpose therein a minimum value of resistance whereby a maximum or welding current flows through said circuit, and to thereafter actuate said contactor mechanism to first introduce resistance into said circuit at a predetermined rate and to thereafter interrupt said circuit, said contactor mechanism being effective, before interrupting said circuit, to introduce resistance into said circuit in sufficient quantity to, under steady state conditions, establish a minimum current in said circuit which is a minor fraction of said maximum current, first and second preset timing means operably responsive to said control means, said first timing means serving to determine the length of time said maximum current flows and to actuate said contactor mechanism to initiate said introduction of resistance, said second timing means serving to determine the interval which intervens between said initiation and said interruption of said circuit, said last-mentioned timing interval being sufficiently long in relation to the inductance of said welding circuit to permit the current to fall to substantially said minimum value prior to said interruption, and adjusting means operably associated with said first timing means for varying its timing interval without affecting the timing interval determined by said second timing means.

FRED H. JOHNSON.
CHESTER F. LEATHERS.

REFERENCES CITED

The following references are of record in the file of this patent:

UNITED STATES PATENTS

| Number | Name | Date |
| --- | --- | --- |
| 394,992 | Thomson | Dec. 18, 1888 |
| 1,007,349 | Gerdau | Oct. 31, 1911 |
| 1,061,375 | Heany | May 13, 1913 |
| 1,183,264 | Woodrow | May 16, 1916 |
| 1,458,274 | Clawson | June 12, 1923 |
| 1,959,690 | Roth | May 22, 1934 |
| 2,071,447 | Young | Feb. 23, 1937 |
| 2,104,749 | Jones | Jan. 11, 1938 |
| 2,278,430 | Dawson | Apr. 7, 1942 |
| 2,278,431 | Klemperer | Apr. 7, 1942 |
| 2,347,695 | Leathers | May 2, 1944 |

OTHER REFERENCES

Sanderson, "Electric System Handbook," first edition, Second Impression, 1930, McGraw-Hill Book Co., Inc., New York city, pages 165 and 166.